Dec. 3, 1963      H. G. SASS      3,112,793
PIPE RECUPERATOR
Filed Feb. 23, 1961
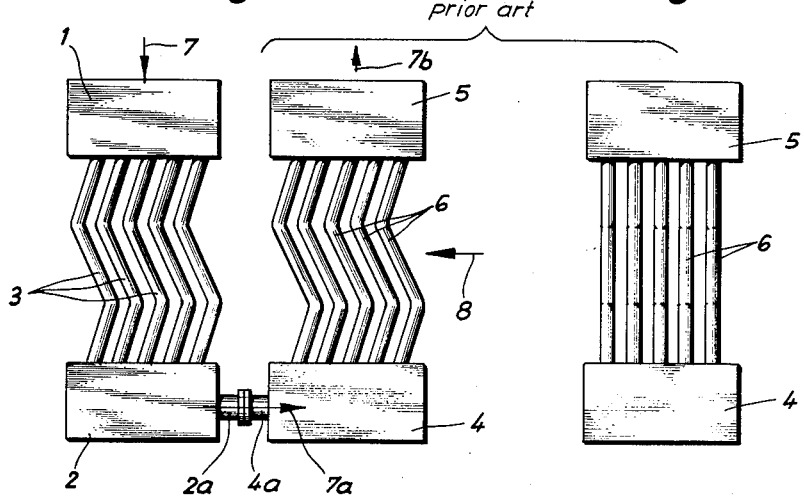
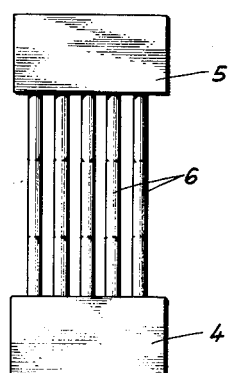
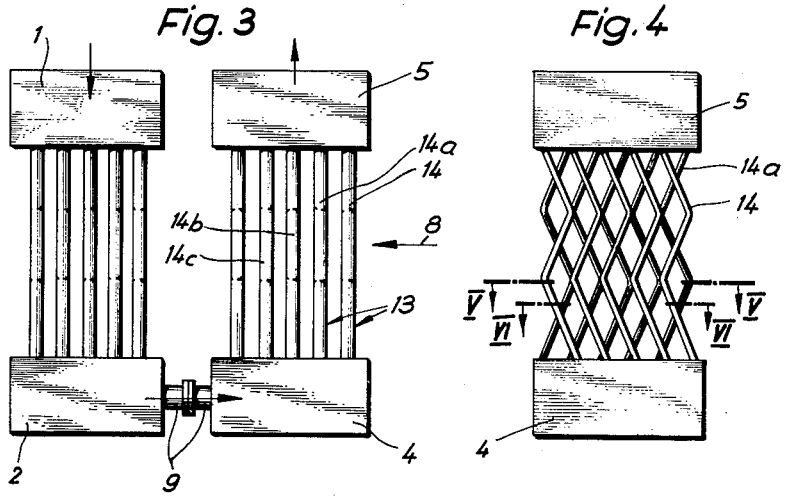
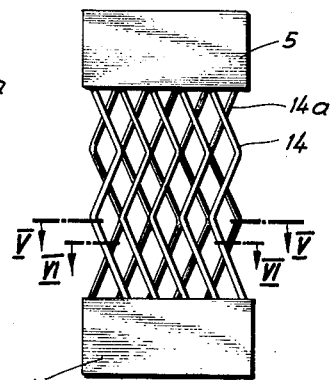
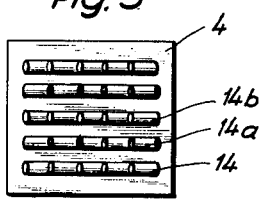
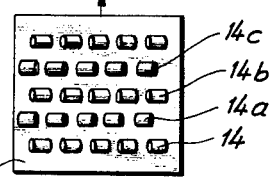

United States Patent Office 3,112,793
Patented Dec. 3, 1963

3,112,793
PIPE RECUPERATOR
Hans Georg Sass, Krefeld-Traar, Germany, assignor to Industrie-Companie Kleinewefers Konstruktions- und Handelsgesellschaft m.b.H., Krefeld, Germany
Filed Feb. 23, 1961, Ser. No. 91,205
Claims priority, application Germany Mar. 4, 1960
1 Claim. (Cl. 165—175)

The present invention relates to a steel pipe recuperator. With recuperators of this type it is known to design the steel pipe between the accumulator or distributor boxes in an arch-shaped or S-shaped manner in order to create a compensation of the longitudinal extension of the individual pipes when said pipes are subjected to thermal stresses. With these heretofore known steel pipe recuperators, the steel pipes have a circular cross section, and the arched or S-shaped curved portions of the tubes are located in planes which are parallel to the direction of flow of the flue gases. When seeing these recuperators from the front or from the rear, the steel pipes are arranged in alignment one behind the other. This arrangement, however, makes it unavoidable that the front pipe will be subjected to thermal stresses which are different from those acting upon the pipes which when looking in the direction of flow of the flue gases are located behind said front pipes. In addition thereto, the arch-shaped or S-shaped curvature in the pipes of circular cross section will produce tensions which subject the material of the pipes to considerable stresses.

It is, therefore, an object of the present invention to provide a steel pipe recuperator which will overcome these drawbacks.

It is another object of this invention to provide a steel pipe recuperator in which the stresses in the pipes of arch-shaped or S-shaped contour will be considerably reduced.

It is a further object of this invention to provide a steel pipe recuperator as set forth in the preceding paragraph, which will bring about a more favorable heat transfer from the flue gases flowing through the recuperator to the steel pipes thereof while simultaneously reducing the resistance offered the flue gases.

These and other objects and advantages of the invention will appear more clearly from the following specification in connection with the accompanying drawing, in which:

FIGS. 1 and 2 illustrate respectively in side view and end view a heretofore known arrangement of a steel pipe recuperator.

FIGS. 3 and 4 illustrate a recuperator according to the invention in side view and end view respectively.

FIG. 5 is a section taken along the line V—V of FIG. 4.

FIG. 6 is a section along the line VI—VI of FIG. 4.

FIG. 7 illustrates on a considerably larger scale than the remaining figures a cross section through an individual tube or pipe.

The present invention concerns a steel pipe recuperator with curved steel pipes extending between two collecting or distributing boxes and is characterized in that, for purposes of realizing the above mentioned objects, the pipes have elliptical or similar cross section and are curved in planes transverse to the direction of flow of the flue gases. According to a further feature of the invention, the pipes of succeeding transverse rows are curved in different direction. This means that for instance the first transverse row has a curvature directed to the right-hand side of the recuperator, whereas the next succeeding transverse row of pipes has a curvature directed to the left-hand side whereupon the next succeeding transverse row will again have a curvature toward the right, etc. In this connection, the pipes may be curved or S-shaped. Due to the curvature of the pipes alternating in different direction in the individual transverse rows respectively, the cross section of the flue gas channel is filled by pipes to a great extent. With this arrangement, half of all steel pipes will in contrast to heretofore known embodiments not any longer be in alignment with the other half of the pipes. Such an arrangement brings about a further heat transfer from the flue gases to the pipes.

If a cleaning of the pipes should become necessary, the entire recuperator can be lifted out of the flue gas passage and if desired can be exchanged for another recuperator and can be thoroughly cleaned without any difficulties.

Referring now to the drawing in detail and first to FIGS. 1 and 2, these figures illustrate heretofore known recuperators comprising the collector boxes 1 and 2 interconnected by pipes or tubes 3 while the boxes 4, 5 are connected through pipe or tube 6, and the boxes 2 and 4 communicate with each other through the intervention of pipes 2a, 4a. The medium to be heated up will flow in the direction of the arrows 7, 7a, 7b through the recuperator which in the illustrated instance is formed by two nests of tubes which, of course, may have connected thereto further groups of nests of tubes. The flue gases pass in the direction of the arrow 8 between the steel pipes.

The heretofore known embodiments of steel pipe recuperators have steel tubes of circular cross section, and, as will be evident from a comparison of FIG. 1 with FIG. 2, the curvature or bend in the tubes is located in planes parallel to the direction of flow of the flue gases. As will be evident from FIG. 2, the pipes succeeding each other in the direction of flow of the flue gases are in alignment with each other.

Referring now to FIGS. 3 and 4 showing a recuperator according to the present invention, it will be seen that this recuperator also has collecting boxes 1, 2, 4 and 5 while the boxes 1 and 2 are again connected by means of the pipes located therebetween and similarly the boxes 4 and 5 are connected by the respective pipes therebetween. The boxes 2 and 4 communicate with each other by pipe sections or compensators 9. The direction of flow of the medium to be heated up and of the flue gases is the same as with the recuperators in FIGS. 1 and 2.

For purposes of avoiding the tensions occurring when curving or bending the pipes, according to the present invention the pipes are provided with an elliptic cross section. A pipe of such cross section is designated with the reference numeral 13 and shown in FIG. 7. A tube with elliptical cross section will, when being bent about the longitudinal axis of the ellipse, be more yieldable than is the case when the pipe is bent about the short axis of the ellipse. The longer axis of the ellipse of the pipe cross section is therefore located in the flow direction of the flue gases. In contrast to heretofore known arrangements of the tubes, the tubes 13 located in the cross sectional rows 14, 14a, 14b are curved to different sides in planes which are perpendicular to the direction of flow 8 of the flue gases. When looking at such a recuperator from the side, a view according to FIG. 3 is obtained, whereas FIG. 4 represents a front view of such recuperator according to the invention. As will be seen from FIG. 4, the tubes of succeeding cross sectional rows 14 and 14a are curved toward different sides. The same applies to the succeeding pipes 14b, 14c, etc. FIG. 4 clearly indicates that the free cross section of the flue gas passage can be filled to a great extent by tubes 13. Thus, with the arrangement according to the present invention, only half of all pipes are in alignment with each other. As a result thereof, the heat transfer from the flue gases to the tubes is highly favorably improved.

In addition to the better elasticity of the individual tubes, the different direction of curvature of the tubes will in succeeding rows also bring about a better balancing of the occurring thermal stresses than is the case with tubes which are curved in the same direction. Thus, a tilting or canting of parts 1 and 5 relative to the parts 2 and 4 will be avoided or at least considerably reduced.

It is, of course, to be understood that the present invention is, by no means, limited to the particular construction shown in the drawing but also comprises any modifications within the scope of the appended claim.

What I claim is:

A recuperator comprising spaced boxes and a nest of tubes respectively having an at least approximately elliptical cross-section with the longer axis parallel to the direction of gas flow past the tubes, said tubes being spaced from each other throughout their length and being arranged in spaced rows one behind the other in a single plane in the direction of gas flow past the tubes and connected at their opposite ends to said boxes, said tubes forming the sole mechanical connection between the boxes, each tube between its points of connection with said boxes being offset from a straight line joining said points to form a plurality of portions with adjacent portions extending at an angle to each other lying in said plane and forming a zig zag shape lying partly on one side of said straight line and partly on the other side, the tubes of one row having their corresponding portions in a single plane and parallel with their corresponding angles directed to the same side but being offset in a direction opposite of the tubes of the prior row, each box having a wall through which the tubes extend, said tubes extending through each wall at an angle to the plane of the wall, said tubes being welded to the walls, each tube entering each wall at such an angle that the weld region around each tube end is substantially more nearly circular than the cross-sectional shape of the tube, the points of connection of the respective rows of tubes with the boxes being aligned in planes transverse to said aforementioned planes of said rows, thereby providing clear space for cleaning purposes where the tubes join the boxes, the tubes of successive plane rows entering the said boxes at angles respectively oppositely inclined to the normal to the walls of the boxes through which the tubes enter the boxes to eliminate tilting of the boxes on account of thermal stresses in the recuperator.

References Cited in the file of this patent

UNITED STATES PATENTS

| | | |
|---|---|---|
| 790,884 | Coffin | May 30, 1905 |
| 822,996 | Smith | June 12, 1906 |
| 1,194,909 | White | Aug. 15, 1916 |
| 1,320,652 | Sonneborn | Nov. 4, 1919 |

FOREIGN PATENTS

| | | |
|---|---|---|
| 28,280 | Great Britain | of 1904 |
| 627,576 | France | June 11, 1927 |